United States Patent
Wiemann et al.

(10) Patent No.: US 8,238,242 B2
(45) Date of Patent: Aug. 7, 2012

(54) FLOW CONTROL MECHANISM USING LOCAL AND GLOBAL ACKNOWLEDGEMENTS

(75) Inventors: Henning Wiemann, Aachen (DE); Joachim Sachs, Aachen (DE); Reiner Ludwig, Hurtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 12/279,886

(22) PCT Filed: Feb. 27, 2006

(86) PCT No.: PCT/EP2006/001762
§ 371 (c)(1),
(2), (4) Date: Dec. 12, 2008

(87) PCT Pub. No.: WO2007/095967
PCT Pub. Date: Aug. 30, 2007

(65) Prior Publication Data
US 2009/0154356 A1   Jun. 18, 2009

(51) Int. Cl.
*G01R 31/08* (2006.01)
(52) U.S. Cl. ......................... 370/231; 370/236
(58) Field of Classification Search ............... 370/230.1, 370/231, 236
See application file for complete search history.

(56) References Cited

U.S. PATENT DOCUMENTS

| | | | |
|---|---|---|---|
| 6,151,300 A | | 11/2000 | Hunt et al. |
| 2004/0264366 A1* | | 12/2004 | Swami ........................... 370/229 |
| 2005/0002412 A1 | | 1/2005 | Sagfors et al. |
| 2005/0213586 A1* | | 9/2005 | Cyganski et al. ........ 370/395.41 |
| 2006/0245419 A1* | | 11/2006 | Nag et al. ...................... 370/352 |

FOREIGN PATENT DOCUMENTS

| | | |
|---|---|---|
| EP | 1 175 042 A | 1/2002 |
| WO | WO 00/21231 A1 | 4/2000 |
| WO | WO 0021231 A2 * | 4/2000 |
| WO | WO 2006/024320 A1 | 3/2006 |

OTHER PUBLICATIONS

Hari Balakrishnan et al: "A Comparison of Mechanisms for Improving TCP Performance over Wireless Links" IEEE/ACM Transactions on Networking, IEEE/ACM, New York, NY US. vol. 5, No. 6, Dec. 1997.

* cited by examiner

*Primary Examiner* — Anh-Vu Ly
*Assistant Examiner* — Matthew Hopkins

(57) ABSTRACT

A method of sending data units from a sending node to a receiving node via at least one intermediate node, where: the data units are arranged in a sequence and each data unit is associated with a sequence position identifier; the intermediate node forwards received data units towards the receiving node and sends feedback messages towards the sending node, where in case of a correct receipt of a given data unit at said intermediate node, a corresponding feedback message comprises a first type receive information that indicates said correct receipt at said intermediate node; the receiving node sends feedback messages towards the sending node, where in case of a correct receipt of a given data unit at said receiving node, a corresponding feedback message comprises a second type receive information that indicates said correct receipt at said receiving node; the intermediate node forwards said second type of receipt information towards said sending node and conducts a data unit retransmission procedure in dependence on received receive information; and the sending node conducts a data unit retransmission procedure in dependence on received receipt information of the first and second type, and conducts a data unit flow control procedure for controlling an amount of data that can be sent at a given time in dependence on said first and second type receipt information.

24 Claims, 5 Drawing Sheets

FLOW CONTROL MECHANISM USING LOCAL AND GLOBAL ACKNOWLEDGEMENTS

FIELD OF THE INVENTION

The present invention relates to a method of transmitting data units from a sending node to a receiving node via at least one intermediate node, and to a sending node and intermediate node capable of employing the method of the invention.

BACKGROUND OF THE INVENTION

The present invention relates to the field of data unit communication. In a data unit communication, an amount of data is divided into a sequence of data parts, and these data parts are sent over a connection from a sender to a receiver, where the amount of data is re-assembled from the data parts. In the context of different technologies and protocols, such data parts carry different names, such as segment, cell, frame, protocol data unit, etc. The term "data unit" generically relates to any such data part used in communication.

In data unit communication, one problem is that of reliable transport, because data units can become lost or corrupted during transport. To solve this problem, it is known to send feedback messages from a data unit receiver to a data unit sender, where the feedback messages contain receive information on data units that arrived at the data unit receiver. The data units are identified by means of sequence position identifiers that identify the position of each data unit in the overall sequence. The receive information can be of various kind, e.g. can indicate a correct receipt or an incorrect receipt (which includes no receipt at all). The data unit sender can then appropriately conduct retransmissions of data units that were not correctly received at the data unit receiver. A well known example of such a feedback mechanism is Automatic Retransmission reQuest (ARQ), e.g. as used in the Transmission Control Protocol (TCP).

Another aspect of data unit communication is that of flow control. A flow control procedure is for controlling how much data that can be sent at a given time. The challenge in flow control lies in adjusting the data rate correctly, in such a way that the connection is efficiently utilized. Namely, if too little data is sent in a given period of time (i.e. the capacity of the network between sender and receiver could carry more data), then the through-put is suboptimal, and if too much data is sent in a given period of time, the network is overburdened and data unit losses result. Data unit losses due to overburdening are also referred to as congestion. As a consequence, flow control procedures often comprise a response mechanism for avoiding or reducing congestion in the connected network, in response to detecting an event that indicates a possible loss of a data unit or to receiving an indication of congestion. Such a response mechanism may comprise changing the value of a data rate limitation parameter towards a smaller data rate. As an example, in the well-known window based flow control scheme, such a data rate limitation parameter can be a window that defines how many unacknowledged data units may be sent at a given time (like the congestion window cwnd of TCP), and the response to congestion can then consist in reducing this window.

Flow control procedures may also rely on the receive information in feedback messages. For example, in TCP the congestion window cwnd is increased in response to receiving a cumulative acknowledgment from the receiver that indicates a new sequence position identifier. A cumulative acknowledgment or ACK identifies the last data unit correctly received at the receiver that has the highest in-sequence sequence position indicator of all data units received there. This shown in FIG. 2 on the left hand side. In other words, it identifies the sequence position identifier most advanced in the sequence, for which a data unit was correctly received and below which there are no gaps in the sequence. On the other hand, if three duplicate cumulative acknowledgments are received, then the congestion window is reduced.

Although both flow control and retransmission control may use receive information from feedback messages, flow control and retransmission control are two independent and unrelated aspects of a data unit transmission. Retransmission control deals with reliable transmission, whereas flow control deals with efficient network utilization.

As already mentioned, a TCP receiver sends cumulative acknowledgements (ACKs) for data that has been received in the correct order. Upon correct reception of the expected (in-order) segment the receiver sends a cumulative acknowledgement towards the sender. Once the ACK is received at the sender it will advance the lower and upper window edge which allows the sender to transmit new data unit(s). According to the TCP congestion control algorithm the received ACK will furthermore increase the congestion window so that more data can be in flight.

TCP is known to provide a so-called selective acknowledgment (SACK) mechanism. If the receiver detects losses (e.g. it receives out-of-order data units, i.e. not the data unit with the next expected sequence position identifier, but data units with higher sequence position identifiers, see right hand side of FIG. 2), it adds a SACK (selective acknowledgement) block to the TCP ACK. When the sender decides to perform error recovery it sends a retransmission of the negatively acknowledged segments. Furthermore, it decreases the size of the congestion window as it assumes that the loss was caused by congestion, i.e., by too much data traversing the network.

According to TCP, the selective acknowledgement (SACK) does not allow the sender to finally remove the corresponding segments from its window as the receiver might not be able to deliver these bytes to the higher layer (application). By definition, it acknowledges a data block that was received out-of-order, i.e., there is a gap in the datastream.

The round-trip-time (RTT), which indicates the time that passes between the sending of a given data unit and the receipt of a feedback message relating to the given data unit, has a large impact on the performance of TCP's congestion control algorithm, as the sender has to wait for ACKs before being allowed to send new data. In general, the performance of flow control procedures that make use of receive information will depend on the delay between sending a data unit and the receipt of a corresponding feedback message. The problem becomes stronger over long connections, e.g. connections in which the data units are sent from the sender to the receiver over one or more intermediate points.

It is known to use proxies to enhance the performance of TCP connections (in particular in case of links with high bandwidth and large delays). TCP proxies may use split connection approaches i.e. a connection between an ultimate sender and an ultimate receiver is split and the proxy establishes and maintains two separate connections (one to the sender and one to the receiver). The main drawback is that the end-to-end principle is violated. An ACK received by the sender does not confirm successful delivery to the destination but only to the proxy. If the proxy fails in delivering the data towards the receiver (or to the next proxy) already acknowledged data may never reach its final destination. In general, split-connection-proxies can not join or leave an ongoing connection.

With regard to retransmission control over a connection from a sender to a receiver via one or more relay points, a mechanism referred to as Relay ARQ has been proposed in patent application PCT/EP2004/009967, the contents of which are herewith incorporated by reference. An important feature of Relay ARQ is that it establishes a single connection in which a common protocol state is shared between the end nodes and all relay nodes. The protocol state maintained in relay nodes is a soft-state, which allows relay nodes to seamlessly "leave and join" without breaking the Relay ARQ connection. An important aspect behind Relay ARQ is the concept of Relay-Acknowledgements (RACKs). A relay node sends a RACK towards its sending peer to indicate that it has correctly received a data unit. On receiving a RACK, the sending peer may temporarily delegate the retransmission responsibility to the relay node. Besides this first type of receive information that indicates the correct receipt at a relay node, there is also a second type of receive information that indicates a correct receipt at the receiving end-node. Each relay node forwards the second type receive information towards the sending end-node. The ultimate retransmission responsibility should remain with the sending end-node until the receiving end-node acknowledges the successful delivery of the data unit with the second type receive information, i.e. until the sending end-node receives the second type receive information.

OBJECT OF THE INVENTION

The object of the invention is to provide improvements in data unit communication, especially with respect to flow control.

SUMMARY OF THE INVENTION

The object of the invention is solved by the subject-matter described in the independent claims. Advantageous embodiments are described in the dependent claims.

According to an embodiment, the invention relates to a method and system of sending data units from a sending node to a receiving node via at least one intermediate node. The data units are arranged in a sequence and each data unit is associated with a sequence position identifier. The intermediate node forwards received data units towards the receiving node and sends feedback messages towards the sending node, where in case of a correct receipt of a given data unit at said intermediate node, a corresponding feedback message comprises a first type receive information that indicates the correct receipt at said intermediate node. The receiving node sends feedback messages towards the sending node, where in case of a correct receipt of a given data unit at the receiving node, a corresponding feedback message comprises a second type receive information that indicates the correct receipt at said receiving node. The intermediate node forwards the second type of receipt information towards the sending node and conducts a data unit retransmission procedure in dependence on received receive information. The sending node conducts a data unit retransmission procedure in dependence on received receipt information of the first and second type. Furthermore, the sending node also conducts a data unit flow control procedure for controlling an amount of data that can be sent at a given time in dependence on said first and second type receipt information.

An important feature lies in the fact that the flow control procedure depends on both the first and second type of receive information. Therefore, the flow control procedure does not suffer from the disadvantage of necessarily having to wait for feedback from the receiving node, as the flow control can already react to the first type receive information from the intermediate node (which may be the only intermediate node between the sending and receiving nodes, or one of several intermediate nodes). On the other hand, the taking into account of the second type receive information makes it possible to retain the end-to-end flow control responsibility. Namely, in a split connection with proxy, the flow control would only depend on the first type of receive information, whereas in a standard end-to-end connection with proxy the flow control would only depend on the second type of receive information.

The concept of the invention allows decoupling the connection from sending node to intermediate node from the connection between intermediate node and receiving node in terms of flow control, while not giving up the end-to-end flow control responsibility, because the second type receive information is also taken into account. In accordance with a preferred embodiment that emphasizes the end-to-end responsibility, the sending node retains a copy of each sent data unit at least until having received corresponding second type receipt information, whereby the end-to-end retransmission responsibility is also retained.

The present invention can be embodied in many ways. For example, an embodiment can be constructed by adding an appropriate flow control procedure to the sending peer of a Relay ARQ protocol. According to a Relay ARQ protocol, the two types of receive information are present for the purpose of retransmission control. In accordance with the invention, a flow control procedure is added that also makes use of the two types of receive information. On the other hand, the invention can also be embodied by adding a proxy as an intermediate node between a sending node and a receiving node, where the sending node implements a flow control procedure depending on cumulative acknowledgments and selective acknowledgments, e.g. is a TCP sender whose flow control is capable of reacting to ACKs (cumulative acknowledgments) and to SACKs (selective acknowledgments). The proxy can then convey the first type of receive information by using selective acknowledgments, while the second type of receive information is conveyed by the cumulative acknowledgments.

BRIEF DESCRIPTION OF FIGURES

The present invention will now be described on the basis of detailed embodiments, which make reference to the Figures, in which.

DETAILED DESCRIPTION OF EMBODIMENTS

Figure 1:
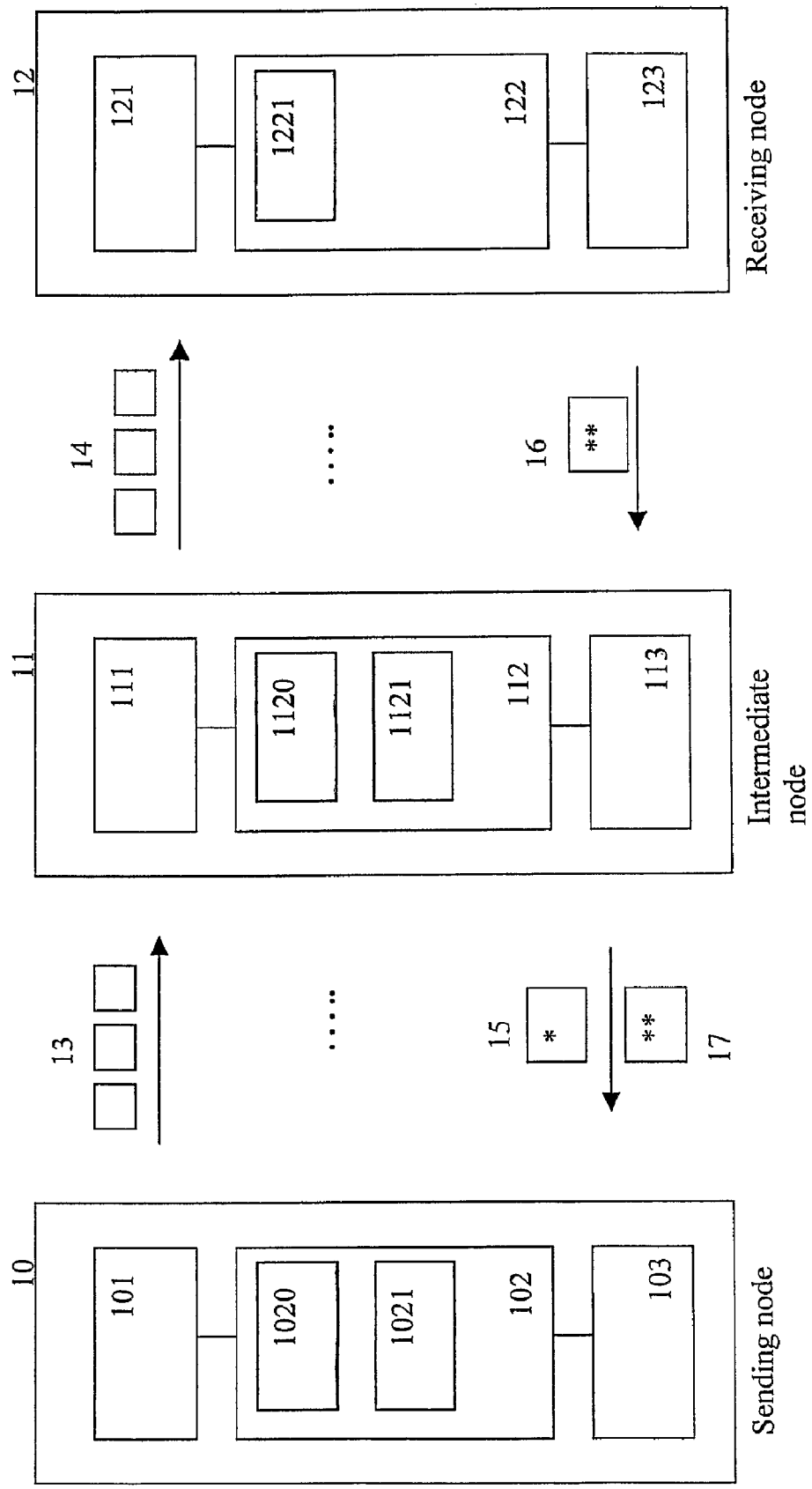
FIG. 1 shows a schematic block diagram of a system of the invention comprising a sending node, intermediate node and receiving node.
Figure 2:
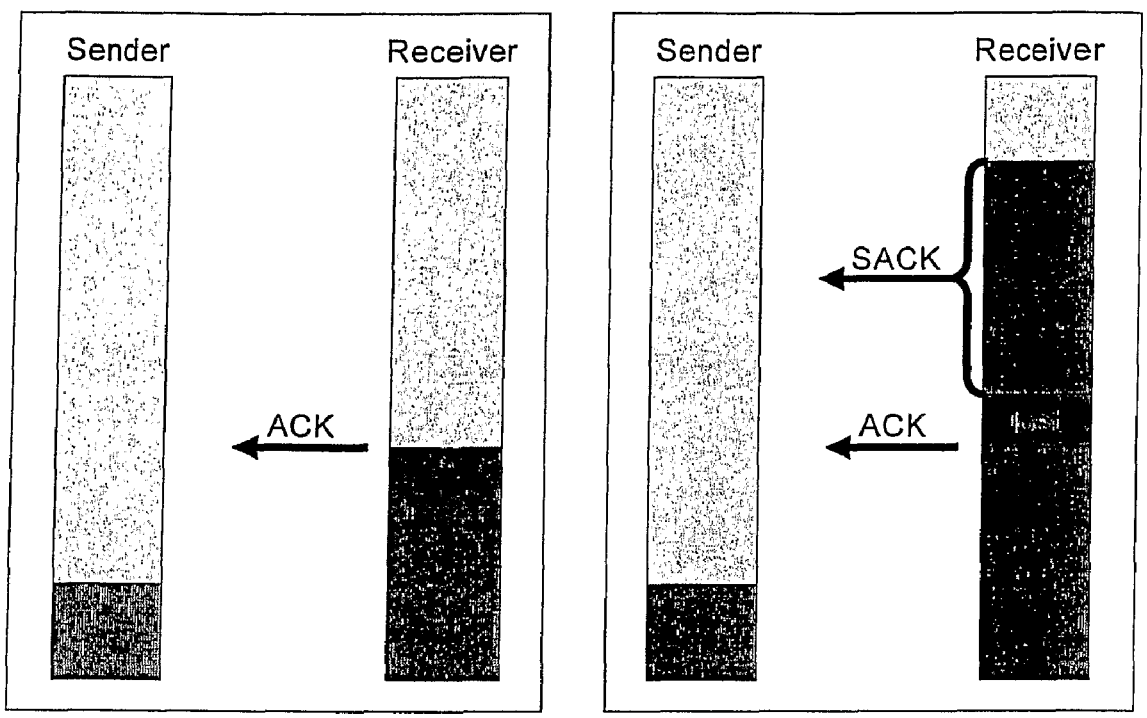
FIG. 2 is a diagram for explaining the basic use of selective acknowledgments.

FIG. 1 shows an embodiment of the present invention. Reference numerals 10, 11 and 12 respectively relate to a sending node, an intermediate node and a receiving node. The sending node 10 performs a data unit communication to the receiving node 12 via the intermediate node 11. It is noted that the communication may involve more intermediate nodes (see dots between the nodes). The sending node 10 comprises an output buffer 101 for holding data units to be sent, an input buffer 103 for receiving feedback messages, and a processor 102 that controls the operation of the sending node 10. The processor 102 comprises a flow control part 1020 and a retransmission control part 1021. The controller 102 will generally comprise further control parts, but these are not shown for simplicity, as they do not relate to the present invention. The buffers 101 and 103 can be provided by one or more memory devices, and the processor 102 can be provided by one or more programmable microprocessors, in which the control parts 1020 and 1021 can be provided as software elements running on the programmable processor 102.

The processor 102 controls the sending node 10 to send data units 13 towards the intermediate node 11. The data units 13 are arranged in a sequence and each data unit is associated with a sequence position identifier. The sequence position identifiers can be any indication suitable for indicating a position in a sequence, e.g. sequence numbers, such as ordinals 1, 2, 3, etc. The sequence position identifiers can also be bit or byte count values that indicate a data position in an overall amount of data being sent, and as such also indicate a sequence position for the data units, e.g. 1024 for the first data unit, 2048 for the second, etc., if each data unit contains 1024 bit.

The retransmission control part 1021 conducts a data unit retransmission procedure in dependence on received receipt information of the first and second type (information * and ** in feedback messages 15, 17), and the flow control part 1020 conducts a data unit flow control procedure for controlling the amount of data that can be sent at a given time, also in dependence on said first and second type receipt information.

The intermediate node 11 comprises a buffer 111 for holding the data of data units 13 received from the sending node 10 (or from a further intermediate node) and to be forwarded as data units 14 towards the receiving node 12. A buffer 113 is provided for receiving feedback messages 16 from the receiving node 12 (or from another intermediate node that forwards the feedback messages 16 from the receiving node 12). A processor 112 is provided that controls the operation of the intermediate node 11. The processor 112 comprises a forwarding control part 1120 and a feedback control part 1121. The controller 112 will generally comprise further control parts, but these are not shown for simplicity, as they do not relate to the present invention. The buffers 111 and 113 can be provided by one or more memory devices, and the processor 112 can be provided by one or more programmable microprocessors, in which the control parts 1120 and 1121 can be provided as software elements running on the programmable processor 112.

The forwarding control part 1120 of the intermediate node 11 forwards the received data units 13 towards the receiving node 12 in data units 14, and the feedback control part 1121 sends feedback messages 15 towards the sending node 10, where in case of a correct receipt of a given data unit at said intermediate node 11, a corresponding feedback message comprises a first type receive information (*) that indicates the correct receipt at said intermediate node 11. The feedback control part 1121 of the intermediate node 11 furthermore forwards second type of receipt information (**) received in feedback messages 16 from the receiving node 12 towards the sending node 10 and the forwarding control part 1120 conducts a data unit retransmission procedure in dependence on the received receive information. It preferably also conducts a flow control procedure for the local traffic of forwarded data units 14 towards the receiving node 12. It is noted that the first type receive information (*) and the second type receive information (**) can also be sent together in a single feedback message.

The receiving node 12 comprises a buffer 121 for receiving the data units 14. A buffer 123 is provided for sending feedback messages 16 to the intermediate node 11 (or to another intermediate node that forwards the feedback messages 16 to the intermediate node 11). A processor 122 is provided that controls the operation of the receiving node 12. The processor 122 comprises a feedback control part 1221. The controller 122 will generally comprise further control parts, but these are not shown for simplicity, as they do not relate to the present invention. The buffers 121 and 123 can be provided by one or more memory devices, and the processor 122 can be provided by one or more programmable microprocessors, in which the control part 1221 can be provided as a software element running on the programmable processor 122.

In the above example, the flow control procedure performed in the sending node 10 depends on both the first and second type of receive information. Therefore, the flow control procedure does not suffer from the disadvantage of necessarily having to wait for the feedback 16 from the receiving node 12, as the flow control in the sending node 10 can already react to the first type receive information (*) from the intermediate node 11. On the other hand, the taking into account of the second type receive information (**) makes it possible to retain the end-to-end flow control responsibility.

The above example allows decoupling the connection from the sending node 10 to intermediate node 11 from the connection between the intermediate node 11 and the receiving node 12 in terms of flow control, while not giving up the end-to-end flow control responsibility, because the second type receive information is also taken into account. In accordance with a preferred embodiment that emphasizes the end-to-end responsibility, the sending node 10 retains a copy of each sent data unit at least until having received corresponding second type receipt information, whereby the end-to-end retransmission responsibility is also retained by the retransmission control part 1021.

The present invention can be embodied in many ways, using a variety of suitable protocols. As an example, the sending node, the at least one intermediate node and the receiving node all implement peers of a relay ARQ protocol. Then, in order to achieve the above embodiment, an appropriate flow control procedure is added to the sending peer of the relay ARQ protocol. The two types of receive information that are present for the purpose of retransmission control are thereby also used in the sender's flow control procedure.

On the other hand, the invention can also be embodied by adding a proxy as an intermediate node between a sending node and a receiving node, where the sending node implements a flow control procedure depending on cumulative acknowledgments and selective acknowledgments, e.g. the sending node is a TCP sender whose flow control is capable of reacting to ACKs (cumulative acknowledgments) and to SACKs (selective acknowledgments). The proxy can then convey the first type of receive information by using selective acknowledgments, while the second type of receive information is conveyed by the cumulative acknowledgments. More detailed examples relating to TCP will be described further on.

The present invention can also be applied in the context of e.g. Reliable Multicast or SCTP (Stream Control Transmission Protocol).

Now further preferred embodiments will be described.

Basically, the flow control procedure of the sending node can be arranged in suitable or desirable way, as long as it reacts to both the first type receive information (indicating that a data unit was correctly received at an intermediate node) and the second type information (indicating that a data unit was correctly received at the receiving node). For example, the reaction can be the same in both cases. Preferably, however, the data unit flow control procedure of the sending node performs a first flow control reaction procedure to receiving the first type of receive information for a sequence position identifier for which no first type receive information was previously received, and a second, different flow control reaction procedure to receiving the second type of receive information for a sequence position identifier for which no second type receive information was previously received.

The first flow control reaction procedure may e.g. comprise sending one or more new data units, and said second flow control reaction procedure comprises changing a value of a send rate limitation parameter towards an increase in send rate. For example, if the send rate limitation parameter is a send rate limitation window (like the congestion cwnd—generally a parameter such that the amount of data in data units that were sent but for which no acknowledgement of correct receipt has been received may not exceed the size of said send rate limitation window), then the second reaction procedure may comprise increasing the window. The reason for allowing the sending of new data units in reaction to receiving an indication that a data unit was correctly received at an intermediate node is that in this case at least a partial transmission was successful, such that the flow control can proceed to send more data, because at least some data has left a partial connection. Preferably, the amount of data in the one or more newly sent data units corresponds (e.g. is at least roughly equal to) the amount of data that was correctly received at the intermediate node. For example, if one data unit is indicated as having been received, then one new data unit may be sent.

The sending of new data units in response to receiving a first type receive information may be unconditional, or may depend on a condition. For example, the first flow control reaction may be such that it only sends one or more new data units if the first type and second type receive information received in one of said feedback messages relate to an uninterrupted section of data of said sequence.

In one embodiment, the first flow control reaction procedure consists in only sending one or more new data units (either data units with sequence position identifiers for which no data units were previously sent, or retransmissions that are requested by the retransmission control procedure), but not changing the value of the send rate limitation parameter, e.g. the rate limitation window. In other words, in this case only the feedback from the receiving node triggers an increase in sending rate. In this way, the sending rate at the sending node remains under control of the end-to-end state of the data unit communication.

According to another embodiment, the first flow control reaction procedure comprises the possibility of also changing the value of said send rate limitation parameter towards an increase in send rate, under a predetermined condition. In this case the send rate between the sending node and the intermediate node can become independent of the send rate between the intermediate node and the receiving node. The predetermined condition can e.g. be that the first type and second type receive information received in one of said feedback messages relate to an uninterrupted section of data of said sequence. In other words, if a feedback message received at the sending node, which contains both information of the first and second kind, indicates the correct receipt of an amount of uninterrupted data of the sequence (i.e. no gap in the sequence) at the intermediate node and the receiving node, then this can be taken as a sign that no losses are occurring and that the transmission is proceeding without congestion. As an example, the second type receive information indicates that data unit no. 8 has been correctly received at the receiver, and the first type receive information indicates that data units no. 9 and 10 have been correctly received at the intermediate node. Under this condition, it can be judged as being possible to change the data rate limiting parameter in such a way that a higher data rate is possible (e.g. increasing the congestion window), as the network does not appear to be fully utilized. In this embodiment, the data rate can thus be increased faster than in a situation in which the data rate limiting parameter is only changed in reaction to feedback from the receiving node, because the RTT towards the intermediate node is smaller than the RTT towards the receiving node. On the other hand, if there is an interruption or gap in the sequence, e.g. the second type receive information indicates that data unit no. 8 has been correctly received at the receiver, and the first type receive information indicates that data unit 10 has been correctly received at the intermediate node, then this is a sign of potential congestion.

According to another embodiment, the intermediate node conducts a potential loss detection procedure for detecting a potential data unit loss between the intermediate node and the receiving node. This can be any suitable procedure for detecting a potential loss, such as a time-out mechanism, the analysis of received feedback messages from the side towards the receiving node, etc. Furthermore, the intermediate node is arranged to conduct a loss response procedure for performing a sending rate reduction control operation towards said sending node in response to detecting a potential data unit loss between the intermediate node and the receiving node. In other words, the intermediate node is preferably arranged in such a way that when it detects a potential data loss on the connection towards the receiving node, it can trigger an action that will lead to a reduction in sending rate on the part of the sending node.

The loss response procedure can be such that a sending rate reduction control operation is performed in response to the detection of any potential loss, i.e. unconditionally. In this case, all potential losses are directly or indirectly signalled to the sending node.

However, according to another embodiment, the loss response procedure may also comprise a decision step for deciding whether or not to perform a sending rate reduction control operation in response to detecting a potential loss between the intermediate node and the receiving node, where the decision step depends on the state of the buffer of the intermediate node for holding data units to be forwarded towards the receiving node (see buffer 111 of FIG. 1). According to this embodiment, the intermediate node can effectively "hide" or "screen" loss indication events from the sending node. This can e.g. be useful if the intermediate node's output buffer is at a low level, such that momentary buffer capacity is high. Then, there is no reason to signal congestion to the sending node, which would generally respond thereto by reducing its data rate. However, in view of the intermediate node's buffering capacity, such a reduction of send rate may not be necessary.

The sending rate reduction control operation can be chosen in any suitable or desirable way. For example, it may comprise sending an explicit notification (such as an Explicit Congestion Notification (ECN)) towards the sending node and/or adjusting a flow control parameter communicated in said feedback messages to said sending node. An example of such an adjusted flow control parameter can be an advertised window, if the flow control operation conducted by the sending node is window based and involves an advertised window communicated to the sending node in the feedback messages.

According to a further embodiment, the sending node can interpret at least cumulative acknowledgments and selective acknowledgments in the feedback messages. It interprets a cumulative acknowledgment as identifying the last data unit correctly received at the receiving node that has the highest in-sequence sequence position indicator of all data units received at said receiving node, and a selective acknowledgment as indicating that an out-of-sequence data unit was correctly received at the receiving node. Furthermore, the data unit flow control procedure of the sending node comprises sending one or more new data units in response to receiving a selective acknowledgment. For example, the sending node is a TCP sender. In accordance with the present embodiment, the intermediate node can then communicate the first type of receive information by sending selective acknowledgments towards said sending node. For example, when correctly receiving a data unit from the sending node, the intermediate node can generate a feedback message that contains a cumulative acknowledgment for the sequence position identifier last indicated by the receiving node in its feedback messages, together with a selective acknowledgment for the sequence position identifier of the data unit that was received correctly from the sending node. In other words, the intermediate node uses the selective acknowledgments as a way of indicating when data units were correctly received at the intermediate node, and thereby makes the flow control of the data unit sending node dependent on the first and second type information, even though no modification to the sending node is necessary. This embodiment is therefore very useful for implementing the concept of the invention in the context of a network without having to modify all the sending nodes.

The intermediate node should only forward cumulative acknowledgments from the receiving node, but not selective acknowledgments from the receiving node. The selective acknowledgments from the receiving node may be used by the intermediate node for its own retransmission control and flow control on the connection from the intermediate node to the receiving node.

In the just described example, it is possible that the flow control procedure of the sending node comprises a duplicate cumulative acknowledgment counting procedure for counting a number of duplicate cumulative acknowledgments received for a given sequence position identifier. It might then conduct a predetermined flow control response for reducing the data rate in reaction to counting a predetermined threshold of duplicate cumulative acknowledgments. (An example of this is the "fast retransmit" mechanism known from TCP, according to which the congestion window is reduced in response to counting three duplicate ACKs.) In such a situation, if the intermediate node sends the selective acknowledgments together with an accompanying cumulative acknowledgment (as this e.g. done in TCP), it is preferable to arrange the duplicate cumulative acknowledgment counting procedure so that it does not increase a count value if a duplicate cumulative acknowledgment is received together with one or more selective acknowledgments that together relate to an uninterrupted section of data of the sequence. In this case, the intermediate node can send feedback messages in which the cumulative acknowledgment is repeated more than the threshold number of times, without provoking a data rate reduction or other unnecessary reaction in the sending node.

As an alternative, when the selective acknowledgments are sent together with an accompanying cumulative acknowledgment, the intermediate node can, when communicating the first type of receive information by sending selective acknowledgments towards the sending node, send less than the predetermined threshold of accompanying duplicate cumulative acknowledgments for a given sequence position identifier. In other words, if the threshold is e.g. three, the intermediate node sends at most two feedback messages carrying the same sequence position identifier for the cumulative acknowledgment.

In a situation in which the sending node ignores cumulative acknowledgements that indicate a lower sequence position than that of a previously received cumulative acknowledgment, and where the intermediate node sends the selective acknowledgments together with an accompanying cumulative acknowledgment, the following embodiment is also possible. When communicating the first type of receive information by sending selective acknowledgments towards the sending node, the intermediate node can set the sequence position identifier in the accompanying cumulative acknowledgment to a value indicating a lower sequence position than a cumulative acknowledgment sent previously by the intermediate node towards said sending node. Like in the other just described embodiments, this avoids an adverse reaction on the part of the sending node, to the concept of using selective acknowledgments as a means for influencing the flow control of the data unit sender on the basis of correct receipts at an intermediate node.

In the previous examples, various embodiments of flow control procedures and retransmission control procedures were described for a sending node (such as node 10 in FIG. 1). It is noted that these examples of flow control and retransmission control can also be implemented in the one or more intermediate nodes (e.g. 11 in FIG. 1) as flow control procedures or retransmission control procedures for controlling the sending of data units being forwarded towards the receiving node (12 in FIG. 1).

It is furthermore noted that the present invention can be embodied as a control procedure for each of the described nodes, and as a consequence also as control software for implementing the respective control procedures when executed in a given node, and as a data carrier for storing the control software.

Now some further examples will be described, which relate to an application of concepts of the invention to nodes operating in accordance with TCP.

Figure 3:
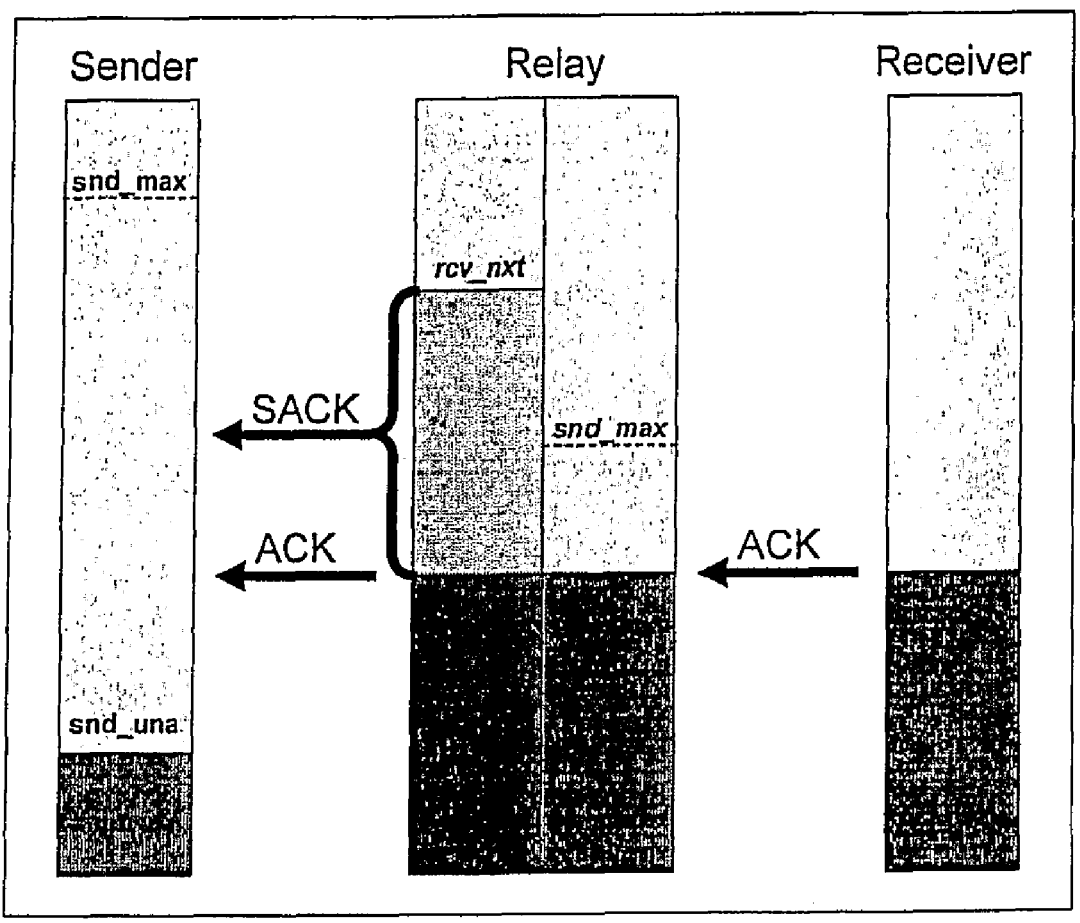
FIG. 3 to 5 show examples in the context of TCP.
Figure 4:
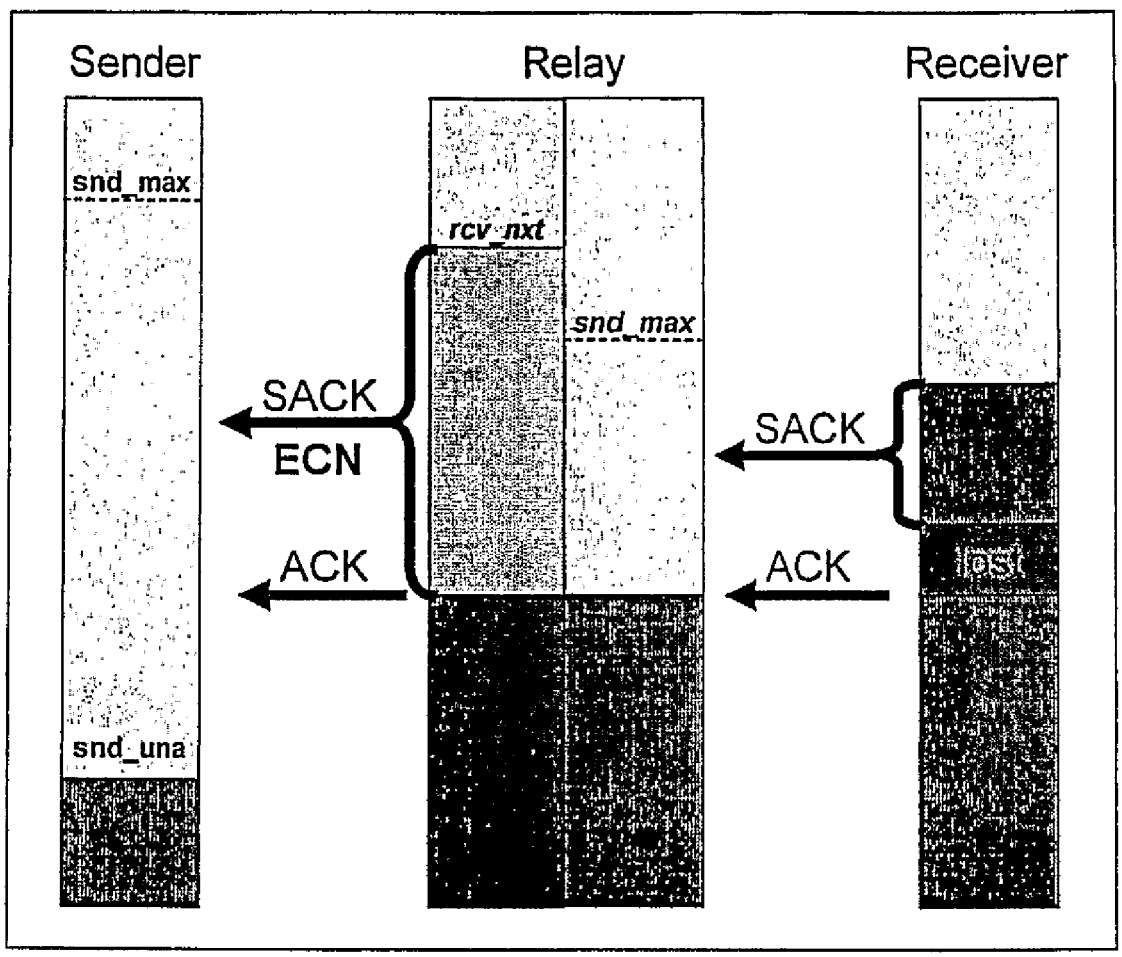

FIGS. 3 and 4 show an example in which a proxy is provided as an intermediate node or relay between a TCP sender and a TCP receiver, where the proxy sends selective acknowledgments (SACKs) in response to a correct receipt of a data unit, in order to influence the flow control of the TCP sender. The relay intercepts the data stream and receives data units (segments) from the sender. It stores the segments locally and forwards them towards the receiver. Several consecutive relays may be used in one connection. The relay does not send a TCP acknowledgement (second type receive information) for the segment it just received as this would violate the end-to-end principal. However, it sends a temporary or local acknowledgement using the selective acknowledgment (SACK) option which is commonly designed for allowing a receiver to (temporarily) acknowledge a block of data that has been received out-of-sequence.

In accordance with the present embodiment, the relay node sends a SACK block towards its sending peer (could be the ultimate sender or another relay) indicating that the corresponding data block was successfully received at another node (however, not at its final destination). As can be seen in FIG. 3, there is no gap between the highest acknowledged sequence number (cumulative ACK) and the SACK block added by the relay to the feedback message. Furthermore, the SACK is added by a relay and not by the ultimate receiver.

Upon reception of a feedback message, the TCP sender performs congestion control in order to determine if it may send further data segments or if it needs to suspend transmission until further acknowledgements are received. The usual congestion control algorithm determines how many segments (bytes) a sender may have in flight, i.e., sent but no ACK received. At any time the number of bytes between the data count value snd_una that indicates the highest sequence position for which an ACK was received and the data count value snd_max that indicates the sequence position for the highest sent segment (see FIG. 3) are assumed to be in flight (or "in the pipe"). According to the flow control at the sender, SACKed blocks may furthermore be deducted from this difference, so that a new segment may be sent for each SACKed segment. This speeds up the congestion control algorithm compared to the state-of-the-art solution as it virtually reduces the round-trip-time of the first congestion control loop. The sender can inject new segments into the network and thereby better utilize the link between sender and relay.

According to the TCP standard the sender may furthermore increase its congestion window (number of packets in flight) when it receives an ACK, but not when it receives a SACK. Obviously, a too small congestion window can limit the transmission performance. That is if the size of the congestion window is below the pipe-capacity, where the pipe-capacity is determined as the data rate provided by the bottleneck link times the round trip time. In the beginning of a TCP download as well as after packet losses (drops) the congestion window becomes too small. In general, a low round trip time allows the congestion window to reach the (lower) pipe-capacity earlier.

FIG. 4 shows an example where a segment is lost on the link between the relay and the ultimate receiver. According to the usual SACK method the receiver returns a duplicate ACK (acknowledging once more the last in-order received segment) with an additional SACK block. According to the TCP standard, a TCP sender detects the loss and performs a retransmission.

The presently considered relay or proxy can implement a RelayARQ-like mechanism with respect to retransmission control, and thereby may perform a local retransmission while sending a Relay Acknowledgment (RACK—first type receive information) to its sending peer. As shown in FIG. 4 the relay may use the special version of a SACK described above in order to signal the RACK information. The role of the proxy is to send ACKs/RACKs to previous nodes or the sender. The content of a feedback message is based on the receive information that the proxy itself receives in feedback messages, and preferably also on the status of its receive and send buffers.

Preferably, the proxy can translate congestion indications from consecutive hops (e.g. DUPACKs) into explicit ECN congestion messages to previous nodes. The relay preferably performs its own congestion control for data units being sent towards the receiver according to the TCP standard. So, if the relay detects an indication of data loss or congestion, it can reduce its congestion window and thereby its send rate. According to a preferred embodiment, if a plurality of relay is involved, all of the relays should preferably use the same congestion control algorithm when forwarding data to the consecutive node (relay or ultimate receiver). This ensures that none of the nodes overloads its outgoing link.

The relay can be arranged such that it translates any indication of loss or congestion into a communication towards the sender. However, as a further embodiment, the relay may decide if it informs its sending peer about the congestion event depending on its local buffer size. If the local buffer becomes too large, the relay should send congestion information (e.g. ECN bit in its ACKs) forcing the sender to reduce its send window as well. Alternatively, it could reduce its advertised window, which would be easier to undo. If the local buffer contains only little data, there is no reason to signal congestion towards the sender. Thereby the present embodiment allows to completely decouple the congestion control of consecutive hops and to let the relay decide about desired buffer sizes. It should be noted that this approach does not violate the usual TCP congestion control algorithm, as a RACK indicates that a segment has left the links towards the next node. Therefore, the sender may inject another segment.

In the above embodiments, it was assumed that the TCP sender only increases its congestion window in response to ACKs, but not in response to SACKs. As an alternative embodiment the sender could also increase the congestion window upon reception of a special SACK block adjacent to the cumulative acknowledgement ACK. In other words, if the ACK and the SACK block in a feedback message indicate an uninterrupted section of data (e.g. consecutive sequence position numbers), then the congestion window can be increased, even if the ACK does not identify a new sequence position identifier. This would allow for an even faster slow start. However, it would require a change in the TCP sender with respect to the usual TCP implementation.

Figure 5:
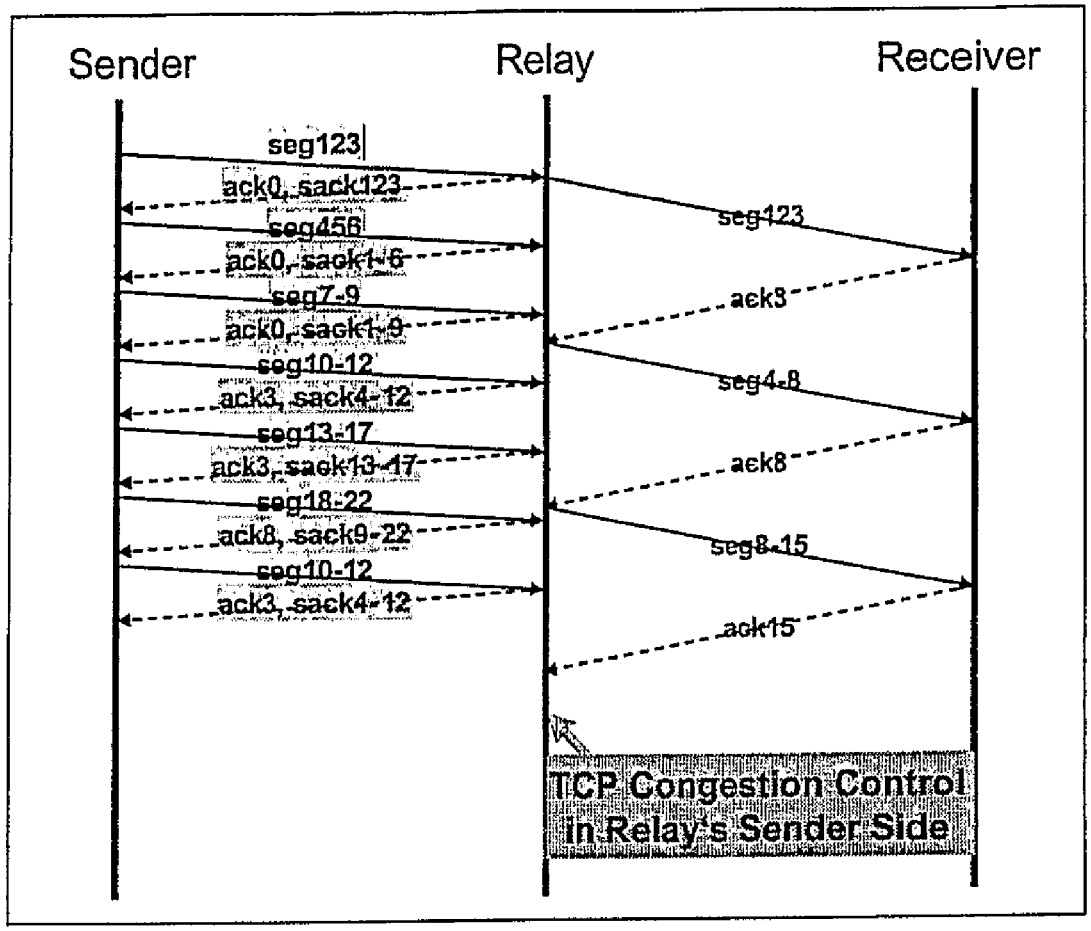

FIG. 5 shows how a TCP proxy manages to speed-up the increase of the congestion window by splitting the congestion control loop into two (or more) parts. In the example, both the sender as well as the relay's sender side is assumed to perform congestion control according to the TCP standard. In this example the sender does not increase its congestion window when receiving SACKs from the relay. It only updates its pipe variable based on the SACK block, i.e. it sends new segments in response to a SACK.

As can be seen from above, the concept of the invention can be put to practice using a usual TCP sender, if a proxy as described is employed. In general the TCP senders therefore do not need to be modified.

With TCP senders, the feature of a reaction to duplicate ACKs should be taken into account when implementing the present invention. Namely, the TCP sender might be forced into an error recovery phase with certain proxy feedback that uses SACKs for transmitting RACKs. This can be seen from FIG. 5. When the third feedback message is received (ack0, sack1-9), this is interpreted by a usual TCP sender with SACK option as a third duplicate acknowledgement (DUPACK), leading to an error recovery phase. There are different methods, how this can be avoided. A new TCP version may e.g. be used in the sender, which does not interpret an ACK as a duplicate ACK, if the SACK block acknowledges data next to the acknowledged data (uninterrupted section of data). Then the proxy should only be used if it knows that this new TCP version is supported. As an alternative, the proxy transmits at most two ACKs for the same sequence number if it does not detect a loss but to indicate the reception of new data (RACK) via the SACK option. This limits the ACK rate between sender and proxy to be at most three times higher than the ACK rate between proxy and receiver, but this should not be a problem. As a further alternative, when sending a RACK (via the TCP SACK field), the proxy can be arranged to not send an ACK for the latest received byte (rcv_nxt) but instead rcv_nxt-1. As a consequence, a TCP sender will ignore this ACK (as it is less then snd_una). Incrementally, TCP senders can be migrated to reacting to this by interpreting the SACK fields as RACK, while not noting the ACK as DUPACK.

There are various different modes of operation possible above described proxy that uses the SACKs as a means for sending first type receive information. For example, end-to-end congestion control in the sender can be performed. This means that the sender updates the congestion window only when ACKs from the final receiver are received. When a proxy receives congestion indications from further nodes or the receiver, it translates these congestion indications immediately into a congestion signal towards the sender, e.g. into an ECN notification. As an alternative, the proxy can hide congestion events and perform flow control. The sender then performs normal congestion control and reacts to every congestion event on the path to the proxy. However, the sender does not necessarily perceive all congestion events happening after the proxy. Instead the proxy filters out these congestion events and only performs local recovery and local congestion control for the following network path. The sending rate at the sender and the proxy can differ, which can lead to a buffer filling up at the proxy. To limit the amount of data buffered in the proxy, the proxy can perform flow control towards the sender. For this, it can e.g. modify the advertised window in the feedback messages sent to the sender, and/or give a congestion indication, e.g. by dropping a packet or by setting the ECN bit. As a further alternative, the sender might perform local congestion control for the network path to the proxy. This means that the sender can also increase the congestion window when feedback messages with SACK options but without gap (uninterrupted section of data) are received. The proxy also performs congestion control for the consecutive path. As a consequence, the congestion state in sender and proxy can differ.

The present invention has been described with reference to preferred embodiments. These only serve as examples and are not limiting to the invention, which is defined by the appended claims.

The invention claimed is:

1. A method of sending data units from a sending node to a receiving node via at least one intermediate node, the method comprising:
    arranging the data units in a sequence and associating each data unit with a sequence position identifier;
    the intermediate node forwarding received data units towards the receiving node and sending feedback messages towards the sending node, where in case of a correct receipt of a given data unit at said intermediate node, a corresponding feedback message comprises a first type receive information that indicates said correct receipt at said intermediate node;
    the receiving node sending feedback messages towards the sending node, where in case of a correct receipt of a given data unit at said receiving node, a corresponding feedback message comprises a second type receive information that indicates said correct receipt at said receiving node;
    the intermediate node forwarding said second type of receipt information towards said sending node and conducting a data unit retransmission procedure in dependence on received receive information; and
    the sending node
    conducting a data unit retransmission procedure in dependence on received receipt information of the first and second type; and
    conducting a data unit flow control procedure for controlling an amount of data that can be sent at a given time in dependence on said first and second type receipt information, wherein the step of conducting the data unit flow control procedures further comprises:
    decoupling a connection from the sending node to the intermediate node from a connection between the intermediate node and the receiving node in terms of flow control while maintaining end-to-end flow control from the sending node to the receiving node, wherein the decouplinq step further comprises implementing:
    a first flow control reaction procedure to receiving said first type receive information for a sequence position identifier for which no first type receive information was previously received and sending one or more new data units, wherein the one or more new data units each have a sequence position identifier for which no data units were previously sent; and
    a second flow control reaction procedure to receiving said second type receive information for a sequence position identifier for which no second type receive information was previously received and changing a value of a send rate limitation parameter towards an increase in send rate.

2. The method of claim 1, wherein said sending node retains a copy of each sent data unit at least until having received corresponding second type receipt information.

3. The method of claim 1, wherein said sending node, said at least one intermediate node and said receiving node all implement peers of a relay ARQ protocol.

4. The method of claim 1, wherein said sending node, said at least one intermediate node and said receiving node all implement peers of the Transmission Control Protocol.

5. The method of claim 1, said data unit flow control procedure of said sending node performing
    a first flow control reaction procedure to receiving said first type of receive information for a sequence position identifier for which no first type receive information was previously received, and
    a second flow control reaction procedure to receiving said second type of receive information for a sequence position identifier for which no second type receive information was previously received.

6. The method of claim 5, wherein said first flow control reaction procedure comprises sending one or more new data units, and said second flow control reaction procedure comprises changing a value of a send rate limitation parameter towards an increase in send rate.

7. The method of claim 6, wherein said first flow control reaction procedure comprises changing the value of said send rate limitation parameter towards an increase in send rate, under a predetermined condition.

8. The method of claim 7, wherein said predetermined condition is that the first type and second type receive information received in one of said feedback messages relate to an uninterrupted section of data of said sequence.

9. The method of claim 5, wherein said first flow control reaction only sends one or more new data units if the first type and second type receive information received in one of said feedback messages relate to an uninterrupted section of data of said sequence.

10. The method of claim 1, wherein said sending node can interpret at least cumulative acknowledgments and selective acknowledgments in said feedback messages, a cumulative acknowledgment as identifying the last data unit correctly received at the receiving node that has the highest in-sequence sequence position indicator of all data units received at said receiving node, and a selective acknowledgment as indicating that an out-of-sequence data unit was correctly received at said receiving node, wherein said data unit flow control procedure of said sending node comprises sending one or more new data units in response to receiving a selective acknowledgment, and wherein said intermediate node communicates the first type of receive information by sending selective acknowledgments towards said sending node.

11. The method of claim 10, wherein said flow control procedure of said sending node comprises a duplicate cumulative acknowledgment counting procedure for counting a number of duplicate cumulative acknowledgments received for a given sequence position identifier, and conducts a predetermined flow control response for reducing the data rate in reaction to counting a predetermined threshold of duplicate cumulative acknowledgments.

12. The method of claim 11, wherein said intermediate node sends said selective acknowledgments together with an accompanying cumulative acknowledgment, and said duplicate cumulative acknowledgment counting procedure does not increase a count value if a duplicate cumulative acknowledgment is received together with one or more selective acknowledgments that together relate to an uninterrupted section of data of said sequence.

13. The method of claim 10, wherein said intermediate node sends said selective acknowledgments together with an accompanying cumulative acknowledgment, and when communicating the first type of receive information by sending selective acknowledgments towards said sending node, sends less than the predetermined threshold of accompanying duplicate cumulative acknowledgments for a given sequence position identifier.

14. The method of claim 10, wherein said sending node ignores cumulative acknowledgements that indicate a lower sequence position than that of a previously received cumulative acknowledgment, and where said intermediate node sends said selective acknowledgments together with an accompanying cumulative acknowledgment, and, when communicating the first type of receive information by sending selective acknowledgments towards said sending node, sets the sequence position identifier in the accompanying cumulative acknowledgment to a value indicating a lower sequence position than a cumulative acknowledgment sent previously by said intermediate node towards said sending node.

15. The method of claim 1, said intermediate node conducting a potential loss detection procedure for detecting a potential data unit loss between the intermediate node and the receiving node, and a loss response procedure for performing a sending rate reduction control operation towards said sending node in response to detecting a potential data unit loss between the intermediate node and the receiving node.

16. The method of claim 15, wherein said loss response procedure comprises a decision step for deciding whether or not to perform a sending rate reduction control operation in response to detecting a potential loss between the intermediate node and the receiving node, said decision step depending on a state of a buffer of said intermediate node for holding data units to be forwarded towards said receiving node.

17. The method of claim 15, wherein said sending rate reduction control operation comprises one or both of sending an explicit notification towards said sending node and adjusting a flow control parameter communicated in said feedback messages to said sending node.

18. The method of claim 17, wherein said flow control operation conducted by said sending node is window based and involves an advertised window communicated to said sending node in said feedback messages, where said flow control parameter adjusted by said sending rate reduction control operation is said advertised window.

19. A data unit sending node comprising:
a sender for sending data units of a data unit communication in a sequence, each sent data unit being associated with a sequence position identifier, and
a receiver for receiving feedback messages that using said sequence position identifiers contain data unit receive information, and
a controller
for interpreting at least a first type and a second type of data unit receive information in said feedback messages, wherein said first type receive information indicates correct receipt at an intermediate node and said second type receive information indicates correct receipt at a receiving node,
for conducting a data unit retransmission procedure in dependence on said feedback messages, and
for conducting a data unit flow control procedure for controlling an amount of data that can be sent at a given time in dependence on said feedback messages, said data unit flow control procedure comprising
a first flow control reaction to receiving said first type of receive information for a sequence position identifier for which no first type receive information was previously received, and
a second flow control reaction to receiving said second type of receive information for a sequence position identifier for which no second type receive information was previously received, where said first flow control reaction comprises sending one or more new data units, and where the one or more new data units each have a sequence position identifier for which no data units were previously sent, and said second flow control reaction comprises changing a value of a send rate limitation parameter towards an increase in send rate, and where said first flow control reaction also comprises changing the value of said send rate limitation parameter towards an increase in send rate under a predetermined condition.

20. The data unit sending node of claim 19, wherein said predetermined condition is that the first type and second type receive information received in one of said feedback messages relate to an uninterrupted section of data of said sequence.

21. The data unit sending node of claim 19, wherein said controller implements a window based flow control scheme and said send rate limitation parameter is a send rate limitation window.

22. The data unit sending node of claim 19, wherein said second type of receive information is a cumulative acknowledgment identifying the last data unit correctly received at the destination node of said data unit communication that has the highest in-sequence sequence position indicator of all-data units received at said destination node.

23. A method of sending data units from a sending node to a receiving node via at least one intermediate node, the method comprising:
arranging the data units in a sequence and associating each data unit with a sequence position identifier;
the intermediate node forwarding received data units towards the receiving node and sending feedback messages towards the sending node, where in case of a correct receipt of a given data unit at said intermediate node, a corresponding feedback message comprises a first type receive information that indicates said correct receipt at said intermediate node;

the receiving node sending feedback messages towards the sending node, where in case of a correct receipt of a given data unit at said receiving node, a corresponding feedback message comprises a second type receive information that indicates said correct receipt at said receiving node;

the intermediate node forwarding said second type of receipt information towards said sending node and conducting a data unit retransmission procedure in dependence on received receive information; and the sending node conducting a data unit retransmission procedure in dependence on received receipt information of the first and second type, and conducting a data unit flow control procedure for controlling an amount of data that can be sent at a given time in dependence on said first and second type receipt information, said data unit flow control procedure of said sending node performing:

a first flow control reaction procedure to receiving said first type of receive information for a sequence position identifier for which no first type receive information was previously received, a second flow control reaction procedure to receiving said second type of receive information for a sequence position identifier for which no second type receive information was previously received, and wherein said first flow control reaction procedure comprises sending one or more new data units, wherein the one or more new data units each have a sequence position identifier for which no data units were previously sent, and said second flow control reaction procedure comprises changing a value of a send rate limitation parameter towards an increase in send rate.

24. A system comprising:

a sending node;

at least one intermediate node; and a receiving node, wherein the sending node is arranged to send data units from to the receiving node via at the least one intermediate node, the sending node being arranged to send the data units in a sequence and associating each data unit with a sequence position identifier;

the intermediate node being arranged to forward received data units towards the receiving node and to send feedback messages towards the sending node, where in case of a correct receipt of a given data unit at said intermediate node, a corresponding feedback message comprises a first type receive information that indicates said correct receipt at said intermediate node;

the receiving node being arranged to send feedback messages towards the sending node, where in case of a correct receipt of a given data unit at said receiving node, a corresponding feedback message comprises a second type receive information that indicates said correct receipt at said receiving node;

the intermediate node being arranged to forward said second type of receipt information towards said sending node and to conduct a data unit retransmission procedure in dependence on received receive information; and the sending node being arranged to:

conduct a data unit retransmission procedure in dependence on received receipt information of the first and second type; and conduct a data unit flow control procedure for controlling an amount of data that can be sent at a given time in dependence on said first and second type receipt information, wherein the sending node is further arranged to conduct the data unit flow control procedures by:

decoupling a connection from the sending node to the intermediate node from a connection between the intermediate node and the receiving node in terms of flow control while maintaining end-to-end flow control from the sending node to the receiving node, wherein the sending node is further arranged to perform the decoupling step by implementing:

a first flow control reaction procedure to receiving said first type receive information for a sequence position identifier for which no first type receive information was previously received and sending one or more new data units, wherein the one or more new data units each have a sequence position identifier for which no data units were previously sent; and a second flow control reaction procedure to receiving said second type receive information for a sequence position identifier for which no second type receive information was previously received and changing a value of a send rate limitation parameter towards an increase in send rate; and the intermediate node comprising:

a data unit receiver for receiving the data units from said sending node;

a data unit forwarder for forwarding said received data units towards the receiving node;

a feedback part for communicating the correct receipt of data units at said intermediate node by sending feedback messages comprising the first type receive information towards said sending node;

a loss detector for detecting a potential data unit loss between the intermediate node and the receiving node;

a loss response controller for performing a sending rate reduction control operation towards said sending node in response to detecting a potential data unit loss between the intermediate node and the receiving node; and wherein said loss response controller comprises a decision part for deciding whether or not to perform the sending rate reduction control operation in response to detecting a potential loss between the intermediate node and the receiving node, said decision part being arranged for taking into account a state of a buffer of said intermediate node for holding data units to be forwarded towards said receiving node.

* * * * *

UNITED STATES PATENT AND TRADEMARK OFFICE
CERTIFICATE OF CORRECTION

| | | |
|---|---|---|
| PATENT NO. | : 8,238,242 B2 | Page 1 of 1 |
| APPLICATION NO. | : 12/279886 | |
| DATED | : August 7, 2012 | |
| INVENTOR(S) | : Wiemann et al. | |

It is certified that error appears in the above-identified patent and that said Letters Patent is hereby corrected as shown below:

In Column 2, Line 3, delete "This" and insert -- This is --, therefor.

In Column 4, Line 57, delete "FIG." and insert -- FIGS. --, therefor.

In Column 14, Line 9, in Claim 1, delete "decouplinq" and insert -- decoupling --, therefor.

In Column 14, Line 32, in Claim 5, delete "said" and insert -- wherein said --, therefor.

In Column 15, Line 43, in Claim 15, delete "said" and insert -- wherein said --, therefor.

In Column 17, Line 39, in Claim 24, delete "from to" and insert -- from --, therefor.

In Column 17, Line 39, in Claim 24, delete "at the" and insert -- at --, therefor.

Signed and Sealed this
Eighteenth Day of December, 2012

David J. Kappos
*Director of the United States Patent and Trademark Office*